United States Patent Office 3,829,415
Patented Aug. 13, 1974

3,829,415
PREPARATION OF SUBSTITUTED
HYDROXY PROPIONATES
Priscilla D. Byrd, Tarrytown, and Henry E. Fritz, Ossining, N.Y., assignors to Union Carbide Corporation, New York, N.Y.
No Drawing. Filed Apr. 11, 1973, Ser. No. 350,161
Int. Cl. C07c 59/00; C08b 11/00
U.S. Cl. 260—231 A  10 Claims

ABSTRACT OF THE DISCLOSURE

Substituted beta-hydroxy propionates have been prepared by the interaction of alkali metal acrylates and hydrocarbons containing at least one primary alcohol gorup.

BACKGROUND OF THE INVENTION

This invention pertains to the preparation of condensation products of acrylic acid alkali metal salts and hydrocarbons containing at least one primary alcohol group.

STATEMENT OF THE INVENTION

It has been found that a useful series of derivatives of acrylic acid alkali metal salts may be prepared by heating said acrylic acid alkali metal salts and an organic compound containing at least one primary alcohol group in the presence of a stoichiometric excess of a strong base calculated on the concentration of acrylic acid alkali metal salts at a temperature of about 80 to about 200°.

The derivatives thus obtained may be looked upon as substituted beta-hydroxy propionates.

Although any of the alkali metal salts of acrylic acid may be used, it is preferred to use the sodium salt or the potassium salt.

The hydroxyl containing organic compound used in this invention covers a wide variety of compounds extending from simple primary aliphatic, cycloaliphatic or aralkyl monohydric alcohols through polyhydric alcohols to polymeric alcohols both natural and synthetic, containing primary hydroxyl groups.

Representative primary monohydric alcohols include methanol, ethanol, 1-propanol, 1-butanol, 1-pentanol, 1-hexanol, 1-decanol, 1-dodecanol, 1-octadecanol, hydroxymethylcyclobutane, hydroxymethylcyclopentane, hydroxymethylcyclohexane, benzyl alcohol, 2-phenylethyl alcohol, 3-phenylpropyl alcohol, 2-(naphthyl)ethyl alcohol, and the like as well as unsaturated alcohols such as allyl alcohol, 2-methyl-2-propen-1-ol and the like.

Representative polyhydric alcohols include simply diols such as ethylene glycol, propylene glycol, butylene glycol, hexylene glycol, diethylene glycol, triethylene glycol, tetraethylene glycol, as well as the lower alkyl monoethers of these glycols. The term lower alkyl is used to mean alkyl groups having up to about 8 carbon atoms therein.

Representative glycol ethers include: 2-methoxyethanol, 2-ethoxyethanol, 2-butoxyethanol, 2-(2-methylpropoxy)ethanol, 2-hexoxyethanol, 2-(2-methoxyethoxy)ethanol, 2-(2-ethoxyethoxy)ethanol, 2-(2-butoxyethoxy)ethanol, 2-(2-hexoxyethoxy)ethanol and the like.

Representative triols include glycerol, 1,1,1-trimethylol propane, trihydroxybutane and the like.

Other polyols include synthetic polymeric alcohols such as poly(ethylene oxide), poly(propylene oxide) and poly(butylene oxide) as well as natural polymeric hydroxyl containing compounds, such as, cellulose and partially substituted cellu'ose derivatives. As explained in the Encyclopedia of Chemical Technology, Volume 3 page 357, Interscience Publishers, (1949) cellulose derivatives include cellulose esters such as cellulose acetate and propionate, cellulose ethers such as methyl cellulose, ethyl cellulose, benzyl cellulose, sodium carboxymethyl cellulose, hydroxyethyl cellulose, and the like.

Secondary and tertiary alcohols are not acceptable as substitutes in this invention because of the low conversions obtained with them.

The hydroxyl-containing organic compounds useful in this invention can be normally liquid or normally solid. Where normally solid organic compounds are used an inert solvent should be used to facilitate the condensation reaction. Suitable inert solvents include normally liquid hydrocarbons such as aliphatic, cycloaliphatic or aromatic compounds, and their secondary or tertiary alcohols. Specific compounds include alkanes such as heptane, octane, iso-octane, and the like; secondary alcohols such as sec-butanol, isopropanol and the like; tertiary alcohols such as t-butanol and the like; cycloaliphatic compounds such as cyclohexane or cycloheptane; and aromatic hydrocarbon such as benzene or toluene.

The strong bases used in the practice of this invention include alkali metal hydroxides such as potassium hydroxide, sodium hydroxide, lithium hydroxide, and the like; alkali metal alkoxides such as potassium methoxide, sodium ethoxide, sodium propoxide and the like; quaternary ammonium hydroxides such as benzyl trimethyl ammonium hydroxide and the like; as well as alkali metals such as sodium, potassium or lithium which form alkoxides by interaction with the hydroxyl-containing hydrocarbon.

Although temperatures in the range of about 80 to 200° C. can be used, it is preferred to use a temperature range of from about 90 to 165° C., depending on the alkoxide moiety being utilized as a Michael donor. With a monohydric alcohol as the Michael donor, it is preferred to use a temperature range of from about 90° to 150° C. With either diols or ether alcohols as the Michael donor, is is preferred to use a temperature range of from about 120° to 165° C.

Reaction time is not narrowly critical but it is preferred to use a reaction time of at least about 10 minutes in order to obtain a yield of at least about 28%. A preferred reaction time range is about 40 to about 180 minutes. Reaction times longer than this are not deleterious since the reaction product is not decomposed upon extended exposure to the reaction conditions.

Although it is preferred to use atmospheric pressures, superatmospheric as well as subatmospheric pressures can be used if desired.

No special equipment is necessary for carrying out the preparation of the substituted beta-hydroxy propionates.

The reaction in its simplest form can be exemplified by the condensation of butyl alcohol with acrylic acid in the presence of sodium hydoxide as shown by the equation below.

$$CH_3(CH_2)_3OH + CH_2{=}CH\overset{O}{\underset{\|}{C}}O^-Na^+ \xrightarrow{NaOH}$$

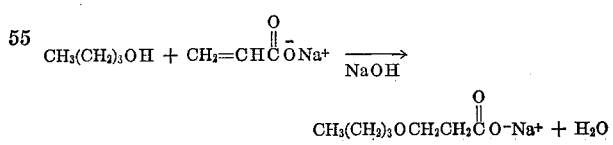

The reaction is a condensation of an alkoxide ion with an acrylate salt to form the salt of the corresponding beta-alkoxy propionic acid. The acrylate salt is formed in situ by the neutralization of the carboxyl group with the sodium hydroxide.

The reaction forms an equilibrium system which can be shifted to increasingly favor the formation of beta-alkoxy propionic acid by using an excess of one of the two reactants. An increase in alkoxide ion has the most important effect on displacement of the equilibrium, while an increase in butyl alcohol or sodium acrylate concentration has a somewhat leser effect. Alkoxide ions are generated by the action of the sodium hydroxide on the butanol. It is necessary in order for an efficient condensation reaction to take place that the base used be one soluble in the acrylic acid at a concentration greater than one equivalent of base per equivalent of acrylic acid. It is preferred that greater stoichiometric excesses of base over acrylic acid, e.g., 1.25/1, 1.5/1, 2/1 and even higher be used. For practical reasons, the excess of base is usually limited by solubility to less than about 2 times the amount of acrylic acid used. The products obtained in the present invention may be used as chelating agents when low molecular weight diols and polyols are used as the hydroxyl-containing hydrocarbon and as textile sizes, suspension agents, thickening agents for cosmetics, food and drilling mud when hydoxyl-containing polymers such as cellulose are used as the hydroxyl-containing hydrocarbon.

The invention is further described in the examples which follow. All parts and percentages are by weight unless otherwise specified.

EXAMPLE 1

500 ml. 3-neck round bottom flask equipped with mechanical stirring, serum cap, thermometer and reflux condenser was charged with 185.3 g. (2.5 moles) of 1-butanol, 35.9 g. (0.55 mole) of potassium hydroxide pellets, and 7.91 g. pyridine (0.1 mole). Acrylic acid (28.8 g. 0.4 mole) was added and the reaction mixture was then heated to reflux (114°) for two hours.

Samples taken during the reaction were stored in serum-capped vials at −78° C. These samples were analyzed by nmr (nuclear magnetic resonance) in 1-butanol-$D_2O$ solution, with pyridine as an internal standard. A sample calculation follows:

Time=1.5 hours
Reactant ratio: 1-Butanol, 2.5 moles; potassium hydroxide, 1.1 moles: acrylic acid, 0.8 mole; pyridine (internal standard) 0.2 mole nmr reference compound= DSS (2,2-dimethyl-2-sila pentane-5-sulfonate ion)
Pyridine absorption from 7.4–9.0δ is $$\frac{136 \text{ counts}}{5 \text{ protons}}$$

for 0.2 moles
There are $$\frac{27.2 \text{ counts}}{\text{pronton}}$$

for 0.2 moles of a compound in this spectrum or $$\frac{108.8 \text{ counts}}{\text{proton}}$$

for 0.8 moles. Since the ratio of peak area/proton of two compounds is equal to the mole ratio of these compounds and all of the 0.8 moles acrylic acid added to the reaction at $t_0$ is present as potassium acrylate or potassium β-butoxypropionate, the sum of these two absorptions (in counts/proton) should total 108.8. The olefinic protons of potassium acrylate absorb in a complex pattern from 5.5–6.5δ

$$\frac{102 \text{ counts}}{3 \text{ protons}} = \frac{34.0 \text{ counts}}{\text{proton}}$$

The absorption of the methylene group adjacent to the carbonyl group in the adduct is a triplet centered at 2.55δ

$$\frac{150 \text{ counts}}{2 \text{ protons}} = \frac{75.0 \text{ counts}}{\text{proton}}$$

$$34.0 \frac{\text{counts}}{\text{proton}} + 75.0 \frac{\text{counts}}{\text{proton}} = 109 \frac{\text{counts}}{\text{proton}} = 0.8$$

moles acrylic acid—derived compounds
therefore $$\frac{75.0 \frac{\text{counts}}{\text{proton}} \text{ for adduct concentration}}{109 \frac{\text{counts}}{\text{proton}} \text{ for initial acrylic acid concentration}} = 69\%$$

conversion to potassium β-butoxy propionate

EXAMPLES 2–5

The procedure described in Example 1 was repeated with varying concentrations of 1-butanol holding the concentration of acrylic acid and potassium hydroxide constant. The percent conversions to potassium β-butoxypropionate are delineated in Table 1. These propionate salts may be converted to β-butoxypropionic acid which can be used as a solvent for organic compounds and polymers.

TABLE 1

| Example No. | 1-butanol, moles | Acrylic acid, moles | KOH, moles | Temp., ° C. | Time, hours | Percent conversion to potassium b-butoxy propionate |
|---|---|---|---|---|---|---|
| 2 | 2.5 | 0.4 | 0.55 | 114 | 1.0 | 87 |
| 3 | 2.5 | 0.4 | 0.55 | 114 | 2.2 | 92 |
| 4 | 1.25 | 0.4 | 0.55 | 118 | 3.0 | 83 |
| 5 | 0.5 | 0.4 | 0.55 | 114 | 2.0 | 74 |

EXAMPLES 6–10

The procedure described in Example 1 was repeated with varying concentrations of potassium hydroxide holding the concentration of 1-butanol and acrylic acid constant. The percent conversion to potassium β-butoxypropionate of various runs was compared in Table 2.

TABLE 2

| | 1-butanol, moles | Acrylic acid, moles | KOH, moles | Temp., ° C. | Time, hours | Percent conversion to potassium b-butoxy propionate |
|---|---|---|---|---|---|---|
| Control A | 2.5 | 0.4 | 0.400 | 112 | 2.0 | None |
| Ex. No.: | | | | | | |
| 6 | 2.5 | 0.4 | 0.428 | 113 | 1.0 | 44 |
| 7 | 2.5 | 0.4 | 0.428 | 113 | 2.0 | 60 |
| 8 | 2.5 | 0.4 | 0.475 | 114 | 1.0 | 68 |
| 9 | 2.5 | 0.4 | 0.475 | 114 | 2.0 | 81 |
| 3 | 2.5 | 0.4 | 0.55 | 114 | 2.2 | 92 |

EXAMPLE 10

The procedure described in Example 1 was followed except for the use of 0.55 moles of sodium hydroxide as the strong base in place of potassium hydroxide. The conversion to sodium β-butoxypropionate was 82 percent.

EXAMPLE 11

The procedure described in Example 1 was followed except for the use of 1.25 moles of 1-butanol instead of 2.5 moles, a reaction time of 1.0 hours instead of 2.0 hours and Triton B (trademark of Rohm and Haas for benzyl trimethylammonium hydroxide) as the strong base in place of potassium hydroxide. The conversion to β-butoxypropionic acid was 26 percent.

EXAMPLE 12

The procedure described in Example 1 was followed except for the use of 2.83 moles of 1-butanol instead of 2.5 moles, metallic sodium in place of potassium hydroxide and a reaction temperature of 125° C. The conversion to sodium β-butoxypropionate was 50 percent.

CONTROL B

The procedure described in Example 1 was followed except for the use of sec-butanol in place of 1-butanol and a reaction temperature of 97° C. because of the lower boiling point of the former. The yield of potassium β-sec-butoxypropionate was less than 4 percent.

CONTROL C

The procedure described in Example 1 was followed except for the use of t-butanol in place of 1-butanol and a reaction temperature of 85° C. because of the lower boiling point of the former. The yield of potassium β-t-butoxypropionate was nil.

EXAMPLE 13

Example 1 was repeated with the exception that allyl alcohol was substituted for the 1-butanol. The conversion to potassium β-allyloxypropionate was 80 percent.

EXAMPLE 14

Example 1 was repeated with the exception that a mixture of isomeric linear secondary alcohols containing 11 to 15 carbon atoms ethoxylated with 7 moles of ethylene oxide per mole of alcohols and having a molecular weight of 508 was substituted for the 1-butanol. The conversion to the corresponding substituted β-hydroxypropionate was 59 percent.

EXAMPLE 15

Example 1 was repeated with the exception that nonylphenol ethoxylated with 40 moles of ethylene oxide per mole having a molecular weight of 198° was substituted for the 1-butanol. Upon work-up of the reaction, an equilibrium quantity of the corresponding potassium substituted β-hydroxypropionate was obtained.

EXAMPLE 16

Example 1 was repeated with the exception that a polyether polyol, having an hydroxyl number of about 45 derived by capping a glycerine/propylene oxide adduct (1 mole:3 moles) with ethylene oxide, was substituted for the 1-butanol. Upon work-up of the reaction, an equilibrium quantity of the corresponding potassium substituted β-hydroxypropionate was obtained.

EXAMPLE 17

Example 1 was repeated with the exception that a polyether polyol, having an hydroxyl number of about 58 derived by capping a glycerine/propylene oxide adduct (1 mole:3 mole) with ethylene oxide, was substituted for the 1-butanol. Upon work-up of the reaction, an equilibrium quantity of the corresponding potassium substituted β-hydroxypropionate was obtained.

EXAMPLE 18

To a 500 ml. resin kettle fitted with a stirrer, condenser, and dropping funnel there were charged 21 grams of cellulose having a degree of polymerization of about 1500, and 298 grams of n-butanol together with 21 grams of water. The resulting slurry was stirred for ½ hour and then 19.2 grams of a 50 percent by weight aqueous sodium hydroxide solution was added. After stirring for an additional ½ hour, 7.3 grams of glacial acrylic acid was added and the reaction mixture was heated to 100° C., and maintained at this temperature for 2½ hours. The reaction mixture was cooled at 25° C., whereupon 11.0 grams of acetic acid was added to neutralize the mixture. Upon filtering the reaction mixture, washing the filter cake three times with a mixture of 35 percent water in isopropanol, and drying to constant weight in a 45° C. vacuum oven, there was obtained a yield of 21.5 grams of sodium carboxyethyl cellulose. Analysis of the product by titration with perchloric acid in glacial acetic acid gave a value for sodium of 2.0 percent, corresponding to a sodium carboxyethyl substitution level (D.S.) of 0.154.

EXAMPLE 19

To a 500 ml. resin kettle fitted with a stirrer, condenser, and dropping funnel there were charged 21 grams of cellulose having a degree of polymerization of about 1500, and 298 grams of sec-butanol together with 21 grams of water. The resulting slurry was stirred for ½ hour and then 43.4 grams of a 50 percent by weight aqueous sodium hydroxide solution was added. After stirring for an additional ½ hour, 29.2 grams of glacial acrylic acid was added and the reaction mixture was heated to 92° C. and maintained at this temperature for 4 hours. The reaction mixture was cooled to 25° C., whereupon 10 grams of acetic acid was added to neutralize the mixture. Upon filtering the reaction mixture, washing the filter cake five times with a 50/50 water/isopropanol mixture, and drying to constant weight in a 45° C. vacuum oven, there was obtained a yield of 27.3 grams of sodium carboxyethyl cellulose. Analysis of the product by titration with perchloric acid in glacial acetic acid gave a value for sodium of 4.56 percent, corresponding to a sodium carboxyethyl substitution level (D.S.) of 0.388. The product was soluble in water, giving a highly viscous solution at 1 percent concentration with a viscosity at 25° C. of 6250 cps. (LVF Brokfield Spindle 4 @ 30 r.p.m.).

EXAMPLE 20

To a 500 ml. resin kettle fitted with a stirrer, condenser, and dropping funnel there were charged 21 grams of cellulose having a degree of polymerization of about 1500, and 298 grams of isopropanol together with 21 grams of water. The resulting slurry was stirred for ½ hour and then 43.4 grams of a 50 percent by weight aqueous sodium hydroxide solution was added. After stirring for an additional ½ hour, 29.2 grams of glacial acrylic acid was added and the reaction mixture was heated to 82° C. and maintained at this temperature for 5 hours. The reaction mixture was cooled to 25° C., whereupon 9.0 grams of acetic acid was added to neutralize the mixture. Upon filtering the reaction mixture, washing the filter cake three times with a mixture of 25% $H_2O$ in isopropanol, and drying to constant weight in a 45° C. vacuum oven, there was obtained a yield of 23.2 grams of sodium carboxyethyl cellulose. Analysis of the product by titration with perchloric acid in glacial acetic acid gave a value for sodium of 3.0 percent, corresponding to a sodium carboxyethyl substitution level (D.S.) of 0.245.

EXAMPLE 21

To a 500 ml. resin kettle fitted with a stirrer, condenser, and dropping funnel there were charged 21 grams of cellulose having a degree of polymerization of about 1500, and 298 grams of isooctane. The resulting slurry was stirred for ½ hour and then 49.8 grams of a 27.3 percent by weight aqueous sodium hydroxide solution was added. After stirring for an additional ½ hour, 14.6 grams of glacial acrylic acid was added and the reaction mixture was heated to 86° C. and maintained at this temperature for 3 hours. The reaction mixture was cooled to 25° C., whereupon 10 grams of acetic acid was added to neutralize the mixture. Upon filtering the reaction mixture, washing the filter cake three times with isopropanol, and drying to constant weight in a 45° C. vacuum oven, there was obtained a yield of 25.0 grams of sodium carboxyethyl cellulose. Analysis of the product by titration with perchloric acid in glacial acetic acid gave a value for sodium of 3.5 percent corresponding to a sodium carboxyethyl substitution level (D.S.) of 0.29.

EXAMPLE 22

To a three liter resin ketle fitted with a stirrer, condenser, and dropping funnel there were charged 100 grams of cellulose having a degree of polymerization of about 1500, and 1490 grams of sec-butanol together with 108 grams of water. The resulting slurry was stirred for ½ hour and then 128 grams of a 47.7 percent by weight aqueous sodium hydroxide solution was added. After stirring for an additional ½ hour 73 grams of acrylic acid and, ten minutes later, 111 grams of ethylene oxide was added and the reaction mixture was heated to 93° C. and maintained at this temperature for 2 hours. The reaction mixture was cooled to 25° C., whereupon 50 milliliters of acetic acid was added to neutralize the mixture. Upon filtering the reaction mixture, washing the filter cake three times, and drying to constant weight in a 45° C. vacuum oven, there was obtailed a yield of 198.9 grams of sodium carboxyethyl hydroxyethyl cellulose. Analysis for sodium content gave a sodium carboxyethyl substitution level of 0.554 (D.S.). Analysis by the modified Morgan method for ethylene oxide molar substitution gave a hydroxyethyl MS of 2.56. The product made a clear viscous water solution with a viscosity at 25° C., 2 percent concentration, of 7160 cps. (LVF Brookfield Spindle 4, 30 r.p.m.).

Although the invention has been described in its preferred form with a certain degree of particularity, it is understood that the present disclosure has been made only by way of example, and that numerous changes can be made without departing from the spirit and scope of the invention.

What is claimed is:

1. A method of preparing substituted beta-hydroxy propionates which comprises heating a mixture of an alkali metal salt of acrylic acid and an organic compound containing at least one primary hydroxy group in the presence of a stoichiometric exces sof a strong base calculated on the concentration of acrylic acid and soluble therein at a temperature of about 80 to about 200° C. for a time sufficient to effect formation of a beta-hydroxy propionate.

2. Method claimed in claim 1 wherein the alkali metal salt is a sodium salt.

3. Method claimed in claim 1 wherein the alkali metal salt is a potassium salt.

4. Method claimed in claim 1 wherein the hydroxyl-containing organic compound is an alkanol containing about 1 to 18 carbon atoms.

5. Method claimed in claim 4 wherein the alkanol is 1-butanol.

6. Method claimed in claim 1 wherein the hydroxyl-containing organic compound is allyl alcohol.

7. Method claimed in claim 1 wherein the hydroxyl-containing organic compound is a polyol.

8. Method claimed in claim 1 wherein the hydroxyl-containing organic compound is a cellulosic material.

9. Method claimed in claim 1 wherein the temperature is about 90 to about 165° C.

10. Method claimed in claim 1 wherein the time of reaction is at least about 1 hour.

References Cited

UNITED STATES PATENTS

| | | | |
|---|---|---|---|
| 2,010,154 | 8/1935 | Hubacher | 260—535 R |
| 2,352,641 | 7/1944 | Küng | 260—535 R |
| 2,393,000 | 1/1946 | Seeger | 260—535 R |
| 2,750,414 | 6/1956 | Chesley et al. | 260—535 R |
| 3,284,441 | 11/1966 | Bishop et al. | 260—231 CM |
| 3,522,300 | 7/1970 | Gielkens et al. | 260—535 R |

DONALD E. CZAJA, Primary Examiner

R. W. GRIFFIN, Assistant Examiner

U.S. Cl. X.R.

260—535 R